United States Patent
Kviatkovsky et al.

(10) Patent No.: US 12,230,052 B1
(45) Date of Patent: Feb. 18, 2025

(54) SYSTEM FOR MAPPING IMAGES TO A CANONICAL SPACE

(71) Applicant: AMAZON TECHNOLOGIES, INC., Seattle, WA (US)

(72) Inventors: Igor Kviatkovsky, Haifa (IL); Nadav Israel Bhonker, Haifa (IL); Yevgeni Nogin, Tirat Carmel (IL); Roman Goldenberg, Haifa (IL); Manoj Aggarwal, Seattle, WA (US); Gerard Guy Medioni, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/712,655

(22) Filed: Dec. 12, 2019

(51) Int. Cl.
| | |
|---|---|
| *G06K 9/00* | (2022.01) |
| *G06F 18/2131* | (2023.01) |
| *G06F 18/214* | (2023.01) |
| *G06K 9/62* | (2022.01) |
| *G06T 3/00* | (2006.01) |
| *G06T 3/04* | (2024.01) |

(Continued)

(52) U.S. Cl.
CPC ...... *G06V 40/1347* (2022.01); *G06F 18/2131* (2023.01); *G06F 18/214* (2023.01); *G06T 3/04* (2024.01); *G06T 7/70* (2017.01); *G06T 2207/20081* (2013.01); *G06T 2207/20084* (2013.01); *G06T 2207/30196* (2013.01)

(58) Field of Classification Search
CPC ............. G06K 9/00067; G06K 9/6232; G06K 9/6256; G06T 3/0012; G06T 7/70; G06T 2207/20081; G06T 2207/20084; G06T 2207/30196
See application file for complete search history.

(56) References Cited

U.S. PATENT DOCUMENTS

| | | |
|---|---|---|
| 7,225,980 B2 | 6/2007 | Ku et al. |
| 7,949,568 B2 | 5/2011 | Fano et al. |

(Continued)

OTHER PUBLICATIONS

Asthana, et al., "An Indoor Wireless System for Personalized Shopping Assistance" CiteSeerX, In Proceedings of IEEE Workshop on Mobile Computing Systems and Applications, 1994. Retrieved from the Internet: http://citeseerx.ist.psu.edu/viewdoc/summary?doi=10.1.1.127.3033&rank=1.

(Continued)

*Primary Examiner* — Bobbak Safaipour
(74) *Attorney, Agent, or Firm* — Lindauer Law, PLLC

(57) ABSTRACT

Images of a hand are obtained by a camera. A pose of the hand relative to the camera may vary due to rotation, translation, articulation of joints in the hand, and so forth. Avatars comprising texture maps from images of actual hands and three-dimensional models that describe the shape of those hands are manipulated into different poses and articulations to produce synthetic images. Given that the mapping of points on an avatar to the synthetic image is known, highly accurate annotation data is produced that relates particular points on the avatar to the synthetic image. An artificial neural network (ANN) is trained using the synthetic images and corresponding annotation data. The trained ANN processes a first image of a hand to produce a second image of the hand that appears to be in a standardized or canonical pose. The second image may then be processed to identify the user.

21 Claims, 8 Drawing Sheets

(51) Int. Cl.
*G06T 7/70* (2017.01)
*G06V 40/12* (2022.01)

(56) References Cited

U.S. PATENT DOCUMENTS

| | | | |
|---|---|---|---|
| 8,009,864 | B2 | 8/2011 | Linaker et al. |
| 8,189,855 | B2 | 5/2012 | Opalach et al. |
| 8,630,924 | B2 | 1/2014 | Groenevelt et al. |
| 9,235,928 | B2 | 1/2016 | Medioni et al. |
| 9,473,747 | B2 | 10/2016 | Kobres et al. |
| 10,529,137 | B1 * | 1/2020 | Black ................. G06N 3/08 |
| 10,679,046 | B1 * | 6/2020 | Black ................. G06T 17/00 |
| 11,238,650 | B2 * | 2/2022 | Li ....................... G06T 7/74 |
| 11,531,697 | B2 * | 12/2022 | Xie ..................... G06F 16/55 |
| 2011/0011936 | A1 | 1/2011 | Morandi et al. |
| 2012/0284132 | A1 | 11/2012 | Kim et al. |
| 2013/0284806 | A1 | 10/2013 | Margalit |
| 2015/0086107 | A1 | 3/2015 | Dedeoglu et al. |
| 2016/0004905 | A1 * | 1/2016 | Lucey ................. G06T 13/40 382/118 |
| 2017/0371403 | A1 * | 12/2017 | Wetzler ............... G06K 9/78 |
| 2019/0139299 | A1 * | 5/2019 | Buckton ............. G06T 11/001 |
| 2020/0184721 | A1 * | 6/2020 | Ge ...................... G06N 3/045 |
| 2021/0027044 | A1 * | 1/2021 | Lee ..................... G06K 9/6259 |
| 2021/0089845 | A1 * | 3/2021 | Galeev ............... G06N 3/0454 |
| 2021/0390696 | A1 * | 12/2021 | Iwase ................. G06T 7/0012 |
| 2021/0406451 | A1 * | 12/2021 | Iyer .................... G06V 30/40 |

OTHER PUBLICATIONS

Chen, Nina, "Going Polarized: Adding a New Perspective to Industrial Imaging", Lucid Vision Labs, Inc., Nov. 8, 2018, 31 pages. Retrieved from the Internet: https://d1d1c1tnh6i0t6.cloudfront.net/wp-content/uploads/2018/11/Going-Polarized-Presentation.pdf.

He, Kaiming, et al., "Deep Residual Learning for Image Recognition", Microsoft Research, arXiv:1512.03385v1 [cs.CV] Dec. 10, 2015. Retrieved from the Internet: https://academic.microsoft.com/#/detail/2194775991.

Kalnikaite, et al., "How to Nudge In Situ: Designing Lambent Devices to Deliver Information Salience in Supermarkets", ACM, In proceeding of: UbiComp 2011:Ubiquitous Computing, 13th International Conference, UbiComp 2011, Beijing,China, Sep. 17-21, 2011.Retrieved from the Internet: http://www.researchgate.net/publication/221568350_How_to_nudge_in_Situ_designing_lambent_devices_to_deliver_salient_information_in_supermarkets.

Magtek, "mDynamo: Insertion Secure Card Reader/Authenticator (module)", MagTek. Inc., 2 pages. Retrived from the Internet: https://www.magtek.com/content/documentationfiles/d998200127.pdf.

Pop, Cristian, "Introduction to the BodyCom Technology" AN1391, DS01391A, Microchip Technology, Inc., May 2, 2011. Retrieved from the Internet: http://www.microchip.com//wwwAppNotes/AppNotes.aspx?appnote=en555156.

Vu, et al., "Distinguishing Users with Capacitive Touch Communication" WINLAB, Rutgers University, In proceedings of: The 18th Annual international Conference on Mobile computing and networking. pp. 197-208. Aug. 2012. Retrieved from the Internet: http://www.winlab.rutgers.edu/~janne/capacitivetouch_mobicom12.pdf.

* cited by examiner

SYSTEM FOR MAPPING IMAGES TO A CANONICAL SPACE

BACKGROUND

A camera may acquire images of objects, such as hands, that may vary in size, shape, or position with regard to the camera.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
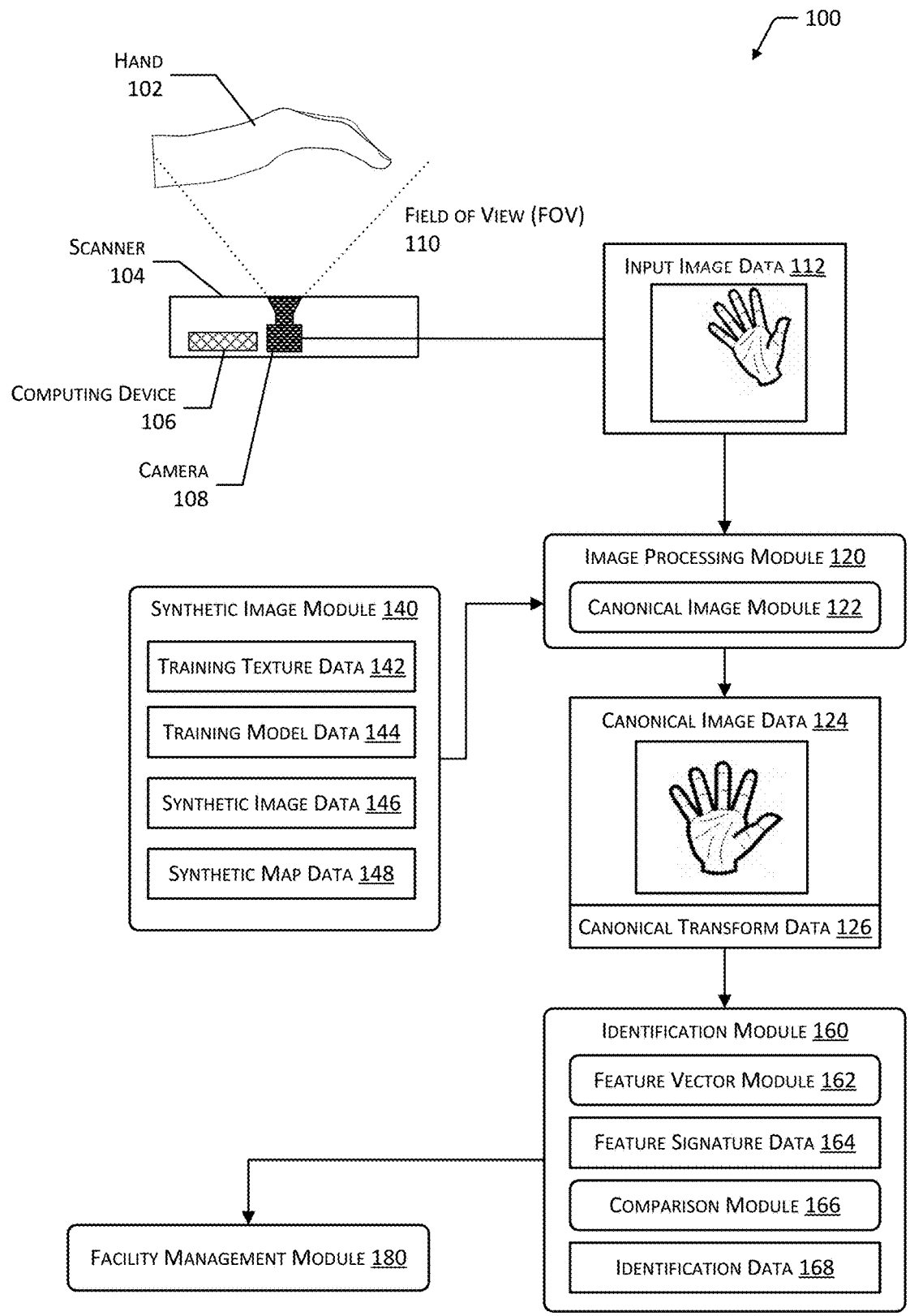
FIG. 1 illustrates a system to produce a canonical image of an object, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Accurate and fast identification of a user provides useful information that may be used in a variety of ways. For example, entry to a material handling facility (facility), office, transportation facility, or other location may be controlled based on user identity. As the user enters the facility, they may be identified using the devices and techniques described herein.

Traditional systems for identifying users suffer from several significant drawbacks including susceptibility to fraud, speed, accuracy, and operational limitations. For example, a traditional system to identify a user by presenting a token, such as an identification card, may be used by someone other than an authorized user. As a result, systems that involve only the use of "something you have" are vulnerable to misuse. Biometric identification systems deal with this by using a characteristic of the particular individual that is difficult or impossible to copy or be transferred.

Biometric identification systems that use biometric features on a finger or palm may require physical contact between the user's hand and a scanning device. This physical contact may be deemed unsanitary and may be difficult to accomplish for some users. Users may also place their hands in various configurations, positions, alignments, and so forth. For example, one user may spread their fingers and hand centered on the scanning surface while another user may have their fingers closed and have the palm off center. As a result, an input image acquired by that sensor may vary from an ideal pose, reducing overall accuracy of an identification from that input image.

The situation becomes more complex when there is no contact surface to otherwise constrain the pose of the hand relative to the camera. For example, a user holding their hand over a scanning device that includes an upward facing camera may have their palm tilted at various angles, finger joints may be bent, distance from the camera may change, and so forth. Due to the additional degrees of freedom that are provided to the unconstrained hand, the input image produced by this type of system may exhibit even greater variability than the scanning device that involves a hand coming into contact with a guide or window device. If unaccounted for, this variability can also reduce overall accuracy of the identification from the input image.

Systems may deal with this variability in pose of an object, such as a hand, by using rectification techniques that apply a rigid transform to the image to produce a rectified image. However, use of a rigid transform offers limited benefit in situations where the object may have multiple possible articulations and differing shapes and sizes, such as a human hand. As a result, a hand depicted in a rectified image may still vary substantially from an idealized, or canonical presentation. Because of this variation, an identification module that attempts to determine features in the rectified image and make an identification may require substantial computational resources to use the rectified image. For example, such an identification module may involve a complex neural network that has been trained to determine features that are invariant to non-rigid deformations. By analogy, because the rectified image differs from the canonical presentation, the identification module has to "work harder" to deal with the potential variations present in the rectified image.

Described in this disclosure are techniques and systems to determine, from an input image, a canonical image. For example, an input image of a hand in a given pose as acquired by an upward facing camera would be remapped into a canonical image in which the hand appears in a standardized pose of palm down, fingers straight, and fingers spread. The resulting canonical image may then be processed by an identification module to make an identification of the user associated with that hand. Continuing the earlier analogy, because the canonical image is in a known and standardized configuration, the identification module may be less complex, operate more quickly, and be more accurate than the module needed to process the rectified image. For example, the identification module does not need to be trained or subsequently operated to determine features that are invariant to non-rigid deformations.

To determine canonical image data from an input image, a canonical image module uses a pair of neural networks that have been trained to determine a pair of annotation label maps that describe different semantic segments within the input image. In some implementations the semantic segments may comprise regions or groups of polygons associated with the training model data. For example, if the polygons comprise rectangles, a strip of rectangles may be described. Each rectangle (except for those at the edges of the image) has four sides. Opposite sides of a given rectangle are in common with adjacent rectangles in the semantic segment. A particular semantic segment is consistent across different hands. For example, a semantic segment associated with a portion of a finger extending from tip to first joint of the index finger will exist for every hand that has an index finger and a first joint. The pair of annotation label maps may then be combined to determine superposition map data. The superposition map data relates coordinates in the input image with coordinates in the canonical image. The superposition map data may then be used to remap at least a portion of the input image to produce the canonical image. For example, data about a first pixel in the input image may be copied to a second pixel in the canonical image.

The neural networks that generate the annotation label maps may utilize convolutional neural networks in a pyramid scene parsing network configuration. The neural networks may be trained using synthetic images in place of actual images and synthetic maps in place of the annotation label maps. To determine the synthetic images, avatars or representations of actual human hands may be used. The avatar may comprise training model data and associated training texture data. Training model data indicative of a three-dimensional (3D) model of a human hand may be generated. The model may allow for variations in size, articulation of joints, and so forth. For example, the model may shrink, grow, show fingers splayed apart, bend finger joints, and so forth to correspond to data of an actual hand as measured. A training texture is also acquired. For example, a training texture may comprise images obtained from a scanner device that acquires pictures of hands.

The avatar that comprises the model and associated texture is used to produce a synthetic image for training. Because information about the model has been previously determined, information such as placement of joints, side, position of a point of interest on the model, and so forth are precisely known. Likewise, the points in the training texture data with respect to the model are also known. A synthetic image is then determined based on the avatar at some apparent distance and pose relative to a virtual camera.

By using the avatar to determine the synthetic image, the relationship or mapping of particular points of the synthetic image to corresponding particular points in the training texture are also known. The data expressing this relationship is the synthetic map data. To produce a set of training data, various permutations of avatars in various poses and articulations may be generated. The set of training data may then be used to train the neural networks to produce the annotation label maps.

Once the neural networks have been trained, the system may be used to determine canonical images. An input image is processed to determine a feature map. For example, a residual neural network may be used to generate a feature map of the input image. The feature map is then processed by a first neural network module and a second neural network module. The first neural network module provides as output a first annotation label map while the second neural network module provides as output a second annotation label map. The first and second annotation label maps are then used to determine superposition map data. For example, the first annotation label map may relate a particular pixel in the input image to a first coordinate in a canonical space, such as along a "u" axis. Continuing the example, the second annotation label map may relate that same pixel to a second coordinate in the canonical space, such as along a "v" axis. The superposition label map relates the coordinates of the pixel to the respective u and v coordinate in the canonical space.

The superposition map data may then be used to remap at least a portion of the input image to produce the canonical image. For example, data about a first set of pixels in the input image may be copied to the corresponding set of pixels in the canonical image.

The canonical image may then be used by other systems or modules. For example, the canonical image may be processed to determine identification data indicative of the user who presented their hand to produce the input image. To use the system for identification, a user opts in and participates in an enrollment process. The enrollment process may include acquiring input images and processing them into canonical images of the user's hand. Information about the features in these images acquired during enrollment may be stored as a signature that is associated with a particular identity.

By using the canonical image, the computational resources associated with comparing and determining identity are significantly reduced. For example, by using a canonical image, a neural network that is trained to generate a signature is significantly smaller and produces more accurate results because it does not need to be trained to deal with variations of hand pose, articulation, size, and so forth. As a result, overall system performance is substantially improved. For example, compared to a neural network that has been trained to determine signatures that are invariant to non-rigid deformation, the neural network that generates a signature using a canonical image uses less computer memory and fewer processor cycles. The accuracy of the identification is also substantially improved by increasing the confidence value in a recognition.

Scanners may be placed at one or more of entrances to the facility, exits from the facility, or designated areas within the facility. The input images from these scanners may be processed to provide canonical images. The canonical images may then be processed to determine identification data.

Information about the identity of the user may also be used to associate particular actions made by that particular user with an associated account. The facility may include, or have access to, a facility management system. The facility management system may be configured to maintain information about items, users, condition of the facility, and so forth based at least in part on sensor data obtained by one or more sensors such as weight sensors, cameras, and so forth, in the facility and may be used to determine interaction data.

The interaction data may include information about a type of item involved in an interaction, quantity involved in the interaction, whether the interaction was a pick or place, who performed the interaction, and so forth. Interactions may include the user picking an item from an inventory location, placing an item at the inventory location, touching an item at the inventory location, rummaging through items at the inventory location, and so forth. For example, the facility management system may generate interaction data that indicates what item the user picked from a particular lane on a shelf, and then use this interaction data to adjust the count of inventory stowed at that lane.

This interaction data may then be associated with the particular user who has been previously identified, and subsequently used for billing or other purposes. For example, the interaction data and identification data may be used to bill an account associated with the identified user for the item that was picked. By determining and subsequently using the canonical image for identification, latency to identify a user is significantly reduced, improving throughput of the facility.

Illustrative System

A hand 102 of a user is depicted positioned above a scanner 104. The scanner 104 may include a computing device 106 and a camera 108. The camera 108 has a field of view (FOV) 110. During operation of the scanner 104, the camera 108 acquires images of an object in the FOV 110, such as the hand 102, and provides input image data 112. The scanner 104 may include other components which are not shown. For example, the scanner 104 may include lights that illuminate the object in the FOV 110.

In the implementation depicted, the hand 102 is held above the camera 108, with the FOV 110 extending upward. In other implementations, other configurations may be used. For example, the camera 108 may have the FOV 110 extending downwards, and the user may place their hand 102 in the FOV 110 under the scanner 104.

In one implementation the scanner 104 is configured to acquire images of the hand 102 that are illuminated using infrared light that has two or more particular polarizations, with different illumination patterns, and so forth. For example, during operation the user may present their hand 102 with the palm or volar region of the hand toward the scanner 104. As a result, the input image data 112 provides an image of the anterior portion of the hand 102. In other implementations, the input image data 112 may include the back of the hand 102. Separate images may be acquired using different combinations of polarized light provided by the infrared lights.

Depending upon the polarization used, the images produced by the scanner 104 may be of first modality features or second modality features. The first modality may utilize images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include creases, wrinkles, scars, dermal papillae ridges, and so forth in at least the epidermis of the hand 102.

Second modality features comprise those features that are below the epidermis. The second modality may utilize images in which the hand 102 is illuminated with light having a second polarization and obtained by the camera 108 with the polarizer passing light to the camera 108 with the first polarization. For example, the second modality features may include anatomical structures such as veins, bones, soft tissue, and so forth. Some features may be visible in both first modality and second modality images. For example, a crease in the palm may include first modality features on the surface as well as deeper second modality features within the palm.

The user may place their hand 102 within the FOV 110 in various poses, distances, translations, and so forth. The pose of the hand 102 may indicate the rotation of the hand 102 relative to the camera 108 and the articulation of the joints in the hand 102. For example, the pose may be that the hand 102 is rotated with a yaw of −2 degrees, pitch of +5 degrees, and roll of −7 degrees and an articulation in which the fingers are together. The distance may comprise the distance between the camera 108 and the hand 102. For example, the distance may vary from zero in which the hand 102 is in contact with the scanner 104 to several meters in which the hand 102 is too far away for a useful image to be acquired. The translation indicates the translation or apparent position of the hand 102 in a plane that is perpendicular to an optical axis extending away from the camera 108. For example, if the hand 102 is not centered directly above the camera 108, the resulting input image data 112 may show the hand 102 to be translated away from the center of the input image.

In the implementation depicted here, the scanner 104 does not include a guide, scan plate, or other structure that constrains the pose or position of the hand 102. For example, the user may move their hand 102 within the FOV 110 freely, rotating, translating, changing articulation, and so forth without constraint. As a result, the appearance of the hand 102 in the input image data 112 may vary considerably due to changes in articulation, pose, distance, translation, and so forth.

In another implementation, the scanner 104 may include a structure such as a guide or scan plate to constrain at least some movement of the hand 102. For example, the scan plate may comprise a flat pane of glass which the hand 102 may rest upon, and the camera 108 may then acquire an image. However, even in the situations involving the guide, the user 102 may not be fully constrained. For example, the user may place their hand 102 in different articulations such as fingers together, fingers apart, and so forth. The user may also fail to place their hand 102 in the preferred position with regard to the guide, for example only having an edge of their hand 102 in contact with the scan plate while the rest is elevated producing a rotation of the hand 102 with respect to the camera 108. As a result, the input image data 112 may vary considerably, even with the structure to guide the user's hand 102.

An image processing module 120 may receive the input image data 112 and use a canonical image module 122 to determine canonical image data 124 and canonical transform data 126. The modules described in this disclosure may execute on a processor of the computing device 106 within the scanner 104, on another computing device such as a server via a network, or a combination thereof. The canonical image data 124 comprises a canonical image of the hand 102 in a canonical pose and articulation. For example, the canonical pose and articulation may be hand 102 flat and no yaw, pitch, or roll rotation with the fingers spread. The canonical image may also appear to be from a specified distance and specified translation, such as having the image of the hand 102 in the canonical image centered. The canonical transform data 126 may comprise data that is representative of one or more parameters associated with the transform applied to the input image data 112. For example, the canonical transform data 126 may comprise data that is indicative of scaling with respect to one or more axes. Operation of the canonical image module 120 is discussed in more detail in the following figures.

The canonical image module 122 may comprise a plurality of neural networks. For example, the canonical image module 122 may use convolutional neural networks in a pyramid scene parsing network configuration. These neural networks may be trained to perform the functions used to determine the canonical image data 124.

In some implementations the image processing module 120 may perform other operations. For example, the image processing module 120 may apply one or more filters to the input image data 112 before or after processing with the canonical image module 122.

To facilitate training, a synthetic image module 140 may be used. The synthetic image module 140 may accept as input training texture data 142. The training texture data 142 may comprise images of hands 102, or other objects that have been previously acquired. In some implementations, the training texture data 142 may be acquired using the scanner 104. In other implementations other devices may be used to acquire the data.

The training texture data 142 used to generate the avatars for training the neural networks does not have to be acquired using the same modality as the scanner 104. For example, if the scanner 104 acquires images that include veins within the hand 102 using infrared light, the training texture data 142 may comprise images of hands in visible light as obtained using a red-green-blue (RGB) camera, images obtained from a grayscale camera, and so forth.

Training model data 144 is determined comprising a three-dimensional (3D) model of at least a portion of a hand 102. The training model data 144 and the associated model may remain within computer memory. The 3D model may include various attributes such as anatomically accurate joints that may be articulated and a surface. For example, the training model data 144 may comprise data indicative of a wireframe mesh. By varying aspects of the model, various different poses and articulations may be simulated. For example, the model of the hand 102 may be stretched, compressed, relative finger lengths may be changed, the entire model of the hand 102 may be rotated or translated with respect to the coordinate system that describes the model, and so forth. The training model data 144 may represent an entire hand 102, or a portion of a hand 102. For example, if the system 100 is to be used to recognize features of the palm of a hand 102, the training model data 144 may omit the anterior portion of the hand 102.

The synthetic image module 140 may use the avatars as expressed in the training texture data 142 and the training model data 144 to produce synthetic image data 146. In one implementation, the avatar may comprise first training texture data 142 that is "wrapped" onto the surface of the model expressed in the training model data 144. For example, techniques associated with texture mapping in computer graphics may be used to apply the training texture data 142 as a texture map to the surface of the wireframe or polygon mesh model described by the training model data 144. Once "wrapped", a synthetic image of the avatar may be determined. For example, the synthetic image data 146 may comprise an image of the wrapped model as acquired by a virtual camera. Continuing the example, the virtual camera may be described as a point in the coordinate space associated with the model from which a field of view subtends a volume within the coordinate space. The synthetic image data 146 may represent a projection of the points in the coordinate space associated with the model with respect to a synthetic image plane at the location and orientation of the virtual camera. In other implementations, other techniques may be used to produce the synthetic image data 146.

Points represented by the training texture data 142 are known before the wrapping. After wrapping, those points are still known. Those points as they appear in the synthetic image data 146 are determined. For example, a projection from a known point in the training texture may be made to the corresponding point in the synthetic image. The relationship or mapping of particular points of the synthetic image to corresponding particular points in the training texture are thus determinable. The data expressing this relationship is the synthetic map data 148. The synthetic map data 148 provides an association between points or portions of the training texture and the synthetic image. In some implementations the synthetic map data 148 provides an association between semantic segments in the training texture data 142 and the corresponding semantic segments as they appear in the synthetic image data 146.

To produce a set of training data, the avatars of hands 102 expressed by the training texture data 142 and the training model data 144 may be arranged into various poses and articulations. For example, each of 1000 different avatars may be articulated into 1,000 different permutations of pose and articulation to produce 1,000,000 synthetic images in the synthetic image data 146 and associated with synthetic map data 148. The synthetic image data 146 and the synthetic map data 148 may then be used to train the neural networks of the canonical image module 122.

Once determined, the canonical image data 124 may be used in various ways. In the implementation depicted here, the canonical image data 124 may be used to attempt to determine an identity associated with the input image data 112. The canonical image data 124 may be provided to an identification module 160. In some implementations, the canonical transform data 126 may also be provided to the identification module 160. The identification module 160 may use a feature vector module 162 to determine feature signature data 164. For example, the feature vector module 162 may use one or more classifiers, neural networks, scale-invariant feature transform (SIFT), and so forth to determine feature vectors representative of features depicted in the canonical image data 124. In some implementations the canonical transform data 126 may also be provided to the feature vector module 162. The feature vectors may then be used to determine the feature signature data 164, indicative of a signature of a set of values that are descriptive of the hand 102 or other object depicted in the canonical image data 124 and associated with the corresponding canonical transform data 126.

A comparison module 166 may compare the feature signature data 164 from the canonical image data 124 with previously stored reference signatures. A confidence value may be determined that is indicative of similarity between the feature signature data 164 and a reference signature that has been previously stored. For example, the confidence value may be determined based on a Euclidean distance in the vector space between the feature signature data 164 and the reference signature. In other implementations, other techniques may be used to compare the canonical image data 124 or features therein with previously stored data.

Significant benefits result from using the canonical image data 124 instead of the input image data 112. By using the canonical image data 124, the identification module 160 may be less complex, require less memory, use fewer processor cycles during operation, and operate more quickly than a system that operates using the input image data 112. For example, the identification module 160 may use one or more neural networks in operation. The complexity of these neural networks is significantly reduced by limiting the input to canonical image data 124 in which the hand 102 or other objects appears in a known and specified pose, articulation, and so forth. As a result, substantial performance benefits accrue from using the canonical image module 122 to produce the canonical image data 124 rather than trying to include the capability within the operation of the identification module 160 to operate with those variations in pose and articulation. For example, compared to a single system, the system described herein that uses the canonical image module 122 to produce the canonical image data 124 which is then used for identification provides accuracy that is five time better.

A user identifier that is associated with the reference signature that is most similar to the canonical image data may be determined to be the identity of the user. The comparison module 166 may produce identification data 168. For example, the user identifier associated with the reference signature may be associated with the user who presented their hand 102.

The identification data 168 may provide information such as one or more of a user identifier associated with the user, a location or identification of the scanner 104, data indicative of date and time that the input image data 112 was obtained, and so forth. The identification data 168 may be subsequently used for various purposes. For example, if the user has been granted access to the facility, a command may be issued to open a gate or door so the user may enter the facility.

In another example, the identification data 168 may be passed to a facility management module 180. The facility management module 180 may use the identification data 168 to associate an identity with that user as they move about the facility. For example, the facility management module 180 may use data from cameras or other sensors in the environment to determine a location of the user. Given a known path of the user from the gate, the user identity indicated in the identification data 168 may be associated with the user as they use the facility. For example, the now identified user may walk to a shelf, remove an item, and leave the facility. The facility management module 180 may determine the interaction data indicative of the removal of the item as being associated with the user identifier specified in the identification data 168, and bill an account associated with the user identifier.

Figure 2:
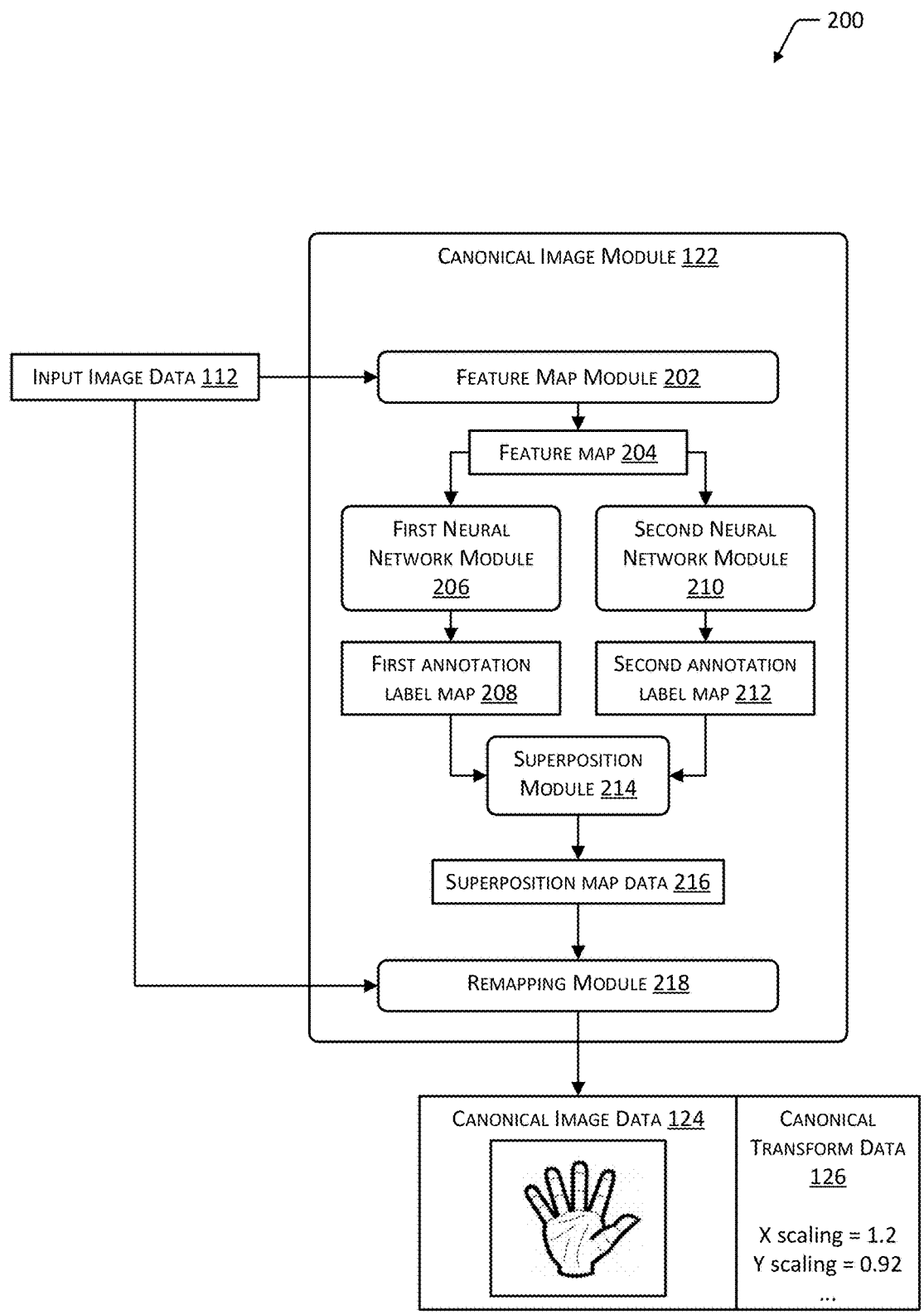
FIG. 2 is a block diagram of a canonical image module that produces a canonical image of an object, such as a user's hand, according to some implementations.

FIG. 2 is a block diagram 200 of the canonical image module 122 that produces a canonical image of an object, such as a user's hand 102, according to some implementations. The canonical image module 122 may include a feature map module 202. The feature map module 202 accepts as input the input image data 112 and produces as output a feature map 204. For example, the feature map module 202 may comprise a pretrained residual neural network with a plurality of layers that utilizes a dilated network strategy to extract the feature map 204. In other implementations other techniques may be used to determine the feature map 204.

The canonical image module 122 may include a first neural network module 206 that produces a first annotation label map 208 and a second neural network module 210 that produces a second annotation label map 212. In this illustration, the first neural network module 206 and the second neural network module 210 have been trained previously. Training is discussed in more detail with regard to FIG. 6.

The first neural network module 206 may comprise a convolutional neural network that accepts as input the feature map 204. The configuration of the first neural network module 206 and the second neural network module 210 are discussed in more detail with regard to FIG. 3. The first annotation label map 208 associates particular portions of the input image data 112 with respective semantic segments in a first set of semantic segments. The second annotation label map 212 associates particular portions of the input image data 112 with respective semantic segments in a second set of semantic segments. The semantic segments are discussed in more detail with regard to FIG. 4.

A superposition module 214 uses the first annotation label map 208 and the second annotation label map 212 to determine superposition map data 216. For example, the first annotation label map 208 may associate a particular pixel or cell in the input image data 112 with a first coordinate in a canonical space, such as a coordinate along a "u" axis. Continuing the example, the second annotation label map 212 may associate the particular pixel or cell in the input image data 112 with a second coordinate in the canonical space, such as a coordinate along a "v" axis that is orthogonal to the "u" axis. The superposition map data 216 may thus relate a portion of the input image data 112 to a particular portion of the canonical image data 124.

A remapping module 218 may use the input image data 112 and the superposition map data 216 to determine the canonical image data 124. For example, one or more values indicative of pixel attributes in the input image data 112 such as color, brightness, and so forth may be copied to the respective pixel at the coordinates of the canonical image data 124. In another example, a cell comprising a set of pixels in the input image data 112 may be copied to the canonical image data 124 to a location based on the superposition map data 216.

In some implementations the remapping module 218, or another module, may determine the canonical transform data 126 associated with the canonical image data 124. The canonical transform data 126 may comprise data that is representative of one or more parameters associated with the transform applied to the input image data 112 to produce the canonical image data 124. For example, the canonical transform data 126 may comprise data that is indicative of scaling with respect to one or more axes.

Figure 3:
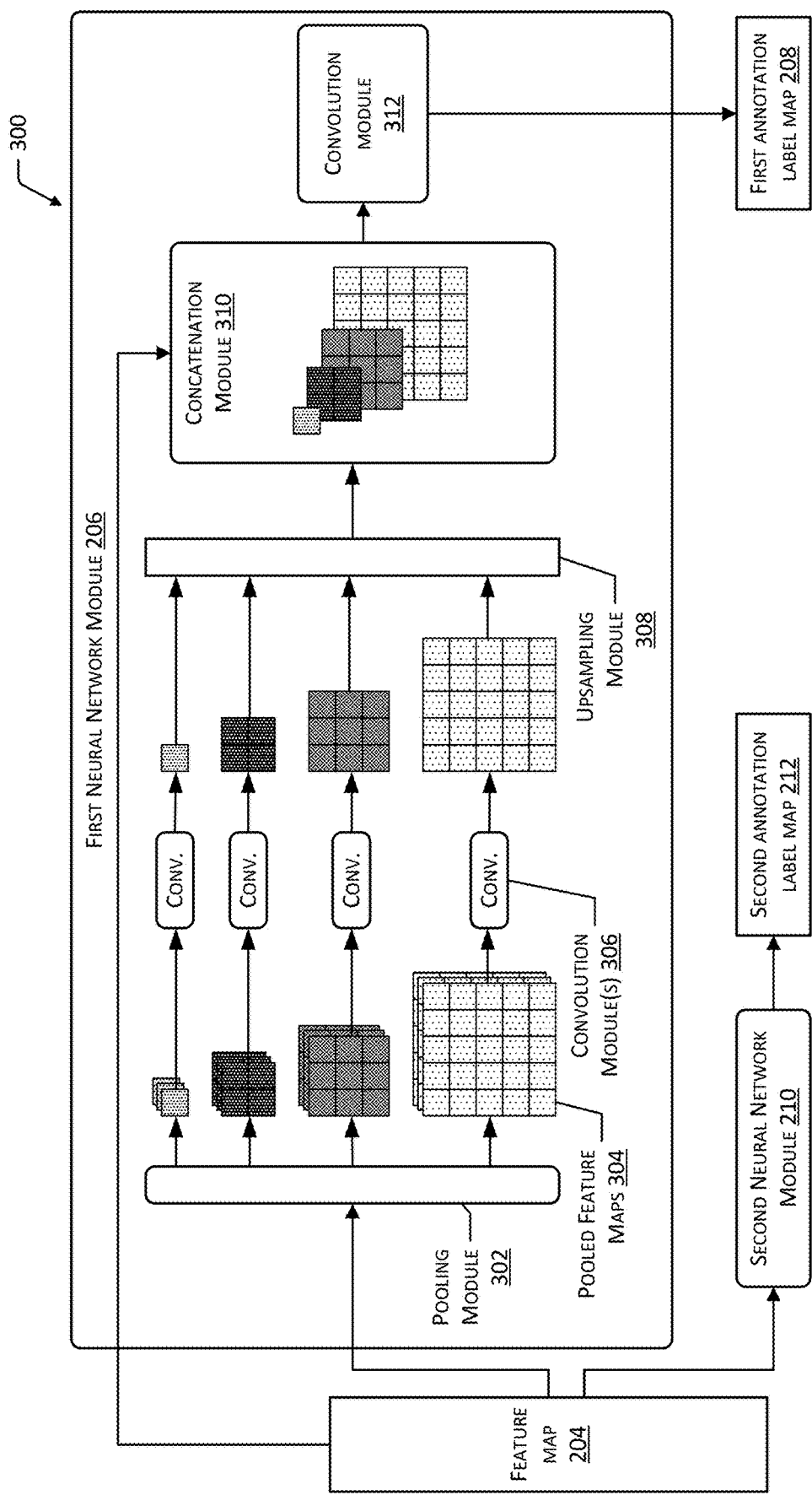
FIG. 3 is a block diagram of neural networks used to determine annotation label maps of an image, according to some implementations.

FIG. 3 is a block diagram 300 of the first neural network module 206 and the second neural network module 210, according to some implementations. An expanded view of the first neural network module 206 is shown. The first neural network module 206 may implement a convolutional network in a pyramid scene parsing network configuration that has been trained using a first set of semantic segments. The pyramid scene parsing network is described by Zhao, Hengshuang, et. al., (Apr. 27, 2017). "Pyramid Scene Parsing Network", arXiv:1612.01105. A pooling module 302 accepts the feature map 204 as input and provides pooled feature maps 304 with varying bin sizes. These pooled feature maps 304 are then provided to respective convolution modules 306. The convolution module 306 performs one or more operations on the pooled feature maps 304, with the output provided to an upsampling module 308. For example, the convolution module 306 may comprise a plurality of convolutional layers. The upsampling module 308 combines the pooled feature maps 304 to an upsampled output which is then provided to a concatenation module 310. The concatenation module 310 concatenates the upsampled output with the feature map 204 to provide concatenated output. The concatenated output is processed by a convolution module 312 that provides a per-pixel prediction of semantic segments in the form of the first annotation label map 208.

In other implementations other neural networks may be used to provide segmentation data. For example, a neural network configured to provide a human parsing model may be used. For example, human parsing is described by Liang, Gon, Shen, and Lin, (Apr. 5, 2018). "Look into Person", arXiv:1804.01984.

The second neural network module 210 may be similarly constructed, having been trained using synthetic map data 148 corresponding to the second set of semantic segments.

Figure 4:
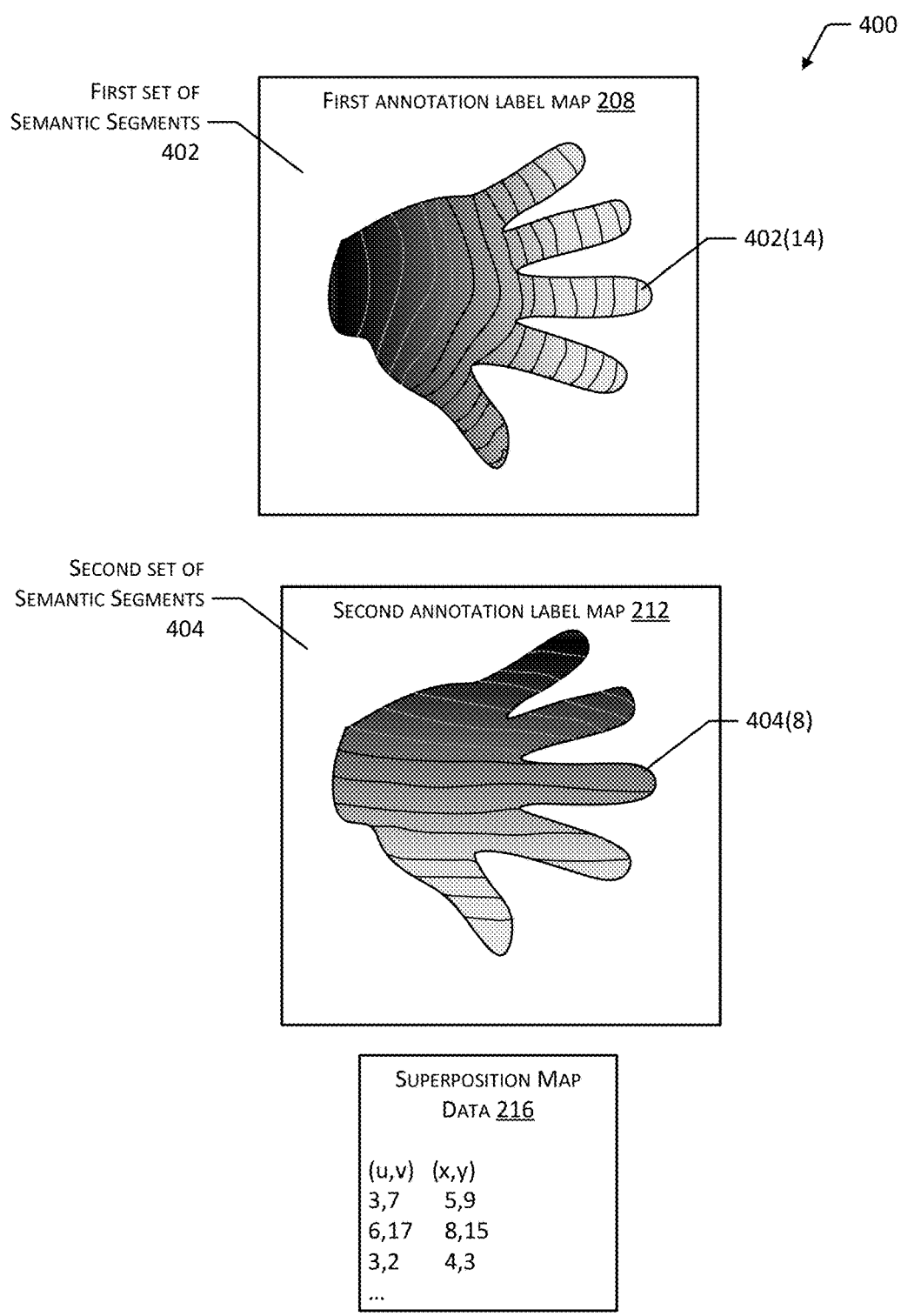
FIG. 4 depicts a visualization of annotation label maps produced by the neural networks that indicate semantic segments, according to some implementations.

FIG. 4 shows a visualization 400 of annotation label maps produced by the neural networks that indicate semantic segments, according to some implementations. A first annotation label map 208 is shown. The first annotation label map 208 provides information about which of a first set of semantic segments 402 a particular pixel or portion of the input image data 112 is associated. In this example, the first set of semantic segments 402 comprise rectangles that are vertically aligned. The semantic segments indicated in the first set of semantic segments 402 may correspond to a first axis in canonical space, such as "u".

A second annotation label map 212 is shown. The second annotation label map 212 provides information about which of a second set of semantic segments 404 a particular pixel or portion of the same input image data 112 is associated. In this example, the second set of semantic segments 404 comprise rectangles that are horizontally aligned. The semantic segments indicated in the second set of semantic segments 404 may correspond to a second axis, perpendicular to the first axis, in the canonical space, such as "v".

Any given pixel or set of pixels within the input image data 112 has an associated set of coordinates within the canonical space, as indicated by the corresponding semantic segments determined by the first neural network module 206 and the second neural network module 210. For example, as shown here, the same point on the tip of the finger is associated with semantic segment 402(14) from the first set of semantic segments 402 and semantic segment 404(8) from the second set of semantic segments 404.

The semantic segments are shown as being of the same size by way of illustration and not as a limitation. For example, some semantic segments may be larger or smaller than others.

In other implementations other arrangements of semantic segments may be used. For example, the first set of semantic segments 402 may comprise rectangular regions having a first long axis parallel to a first axis of the first input image data 112. Continuing the example, the second set of semantic segments 404 may comprise rectangular regions having a second long axis perpendicular to the first axis of the first input image data 112.

The first annotation label map 208 and the second annotation label map 212 may be used to determine the superposition map data 216. For example, the superposition map data 216 may associated particular cells or groups of pixels in the canonical (u,v) space with particular cells or groups of pixels in the input image data 112 coordinates (x,y).

The system 100 may utilize a relatively small number of semantic segments. In one implementation, the first set of semantic segments 402 may comprise thirty or fewer classes, including a background class. The second set of semantic segments 404 may comprise thirty or fewer classes, including a background class. By using a relatively small number of classes, the system 100 is able to reduce the time and computational resources needed to determine the canonical image data 124.

Figure 5:
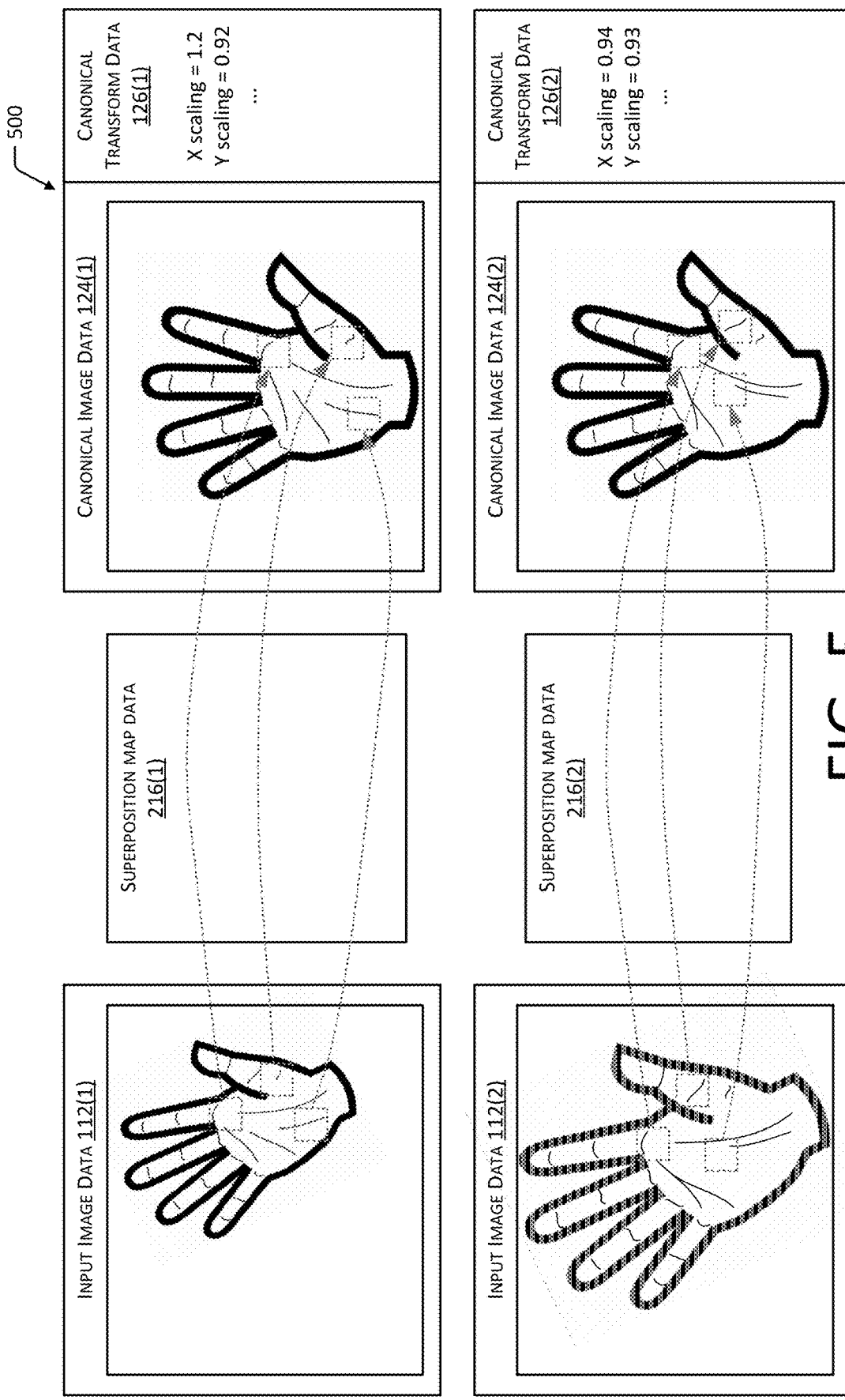
FIG. 5 depicts remapping the input image into a canonical image using a superposition map that is based on a first and second annotation label map, according to some implementations.

FIG. 5 depicts two examples 500 of remapping the input image into a canonical image using a superposition map, according to some implementations. As described above, the input image data 112 is processed by the canonical image module 122. The canonical image module 122 determines superposition map data 216 that is used to associate portions of the input image data 112 with portions of the canonical image data 124. By using the superposition map data 216, the canonical image data 124 is generated that transforms the input image into the canonical image. Canonical transform data 126 may also be provided for the canonical image data 124.

In this illustration input image data 112(1) depicts a hand 102 that is not centered, appears to be smaller, and is rotated with respect to at least two axes. The corresponding canonical image data 124(1) is also shown along with the canonical transform data 126(1). The input image data 112(2) depicts a hand 102 that is much larger, and also rotated. The corresponding canonical image data 124(2) is also shown along with the canonical transform data 126(2). As a result of the canonical image module 122, the canonical image data 124 produced presents a consistent pose, articulation, and orientation.

The remapping module 218 may use one or more techniques to use the superposition map data 216 to generate the canonical image data 124. The input image data 112 may be segregated into cells (indicated by the boxes with the dotted lines). The superposition map data 216 may be indicative of a mapping between a first cell in the input image data 112 and a second cell in the canonical image data 124. Data associated with the first cell, such as values associated with individual pixels, may be copied to the second cell. In some implementations, a linear interpolation may be performed between the center of the cells. In other implementations, the remapping module 218 may use a neural network to determine the canonical image data 124.

The remapping module 218 may also provide the canonical transform data 126. For example, the remapping module 218 may determine the canonical transform data 126 based at least in part on the superposition map data 216.

Figure 6:
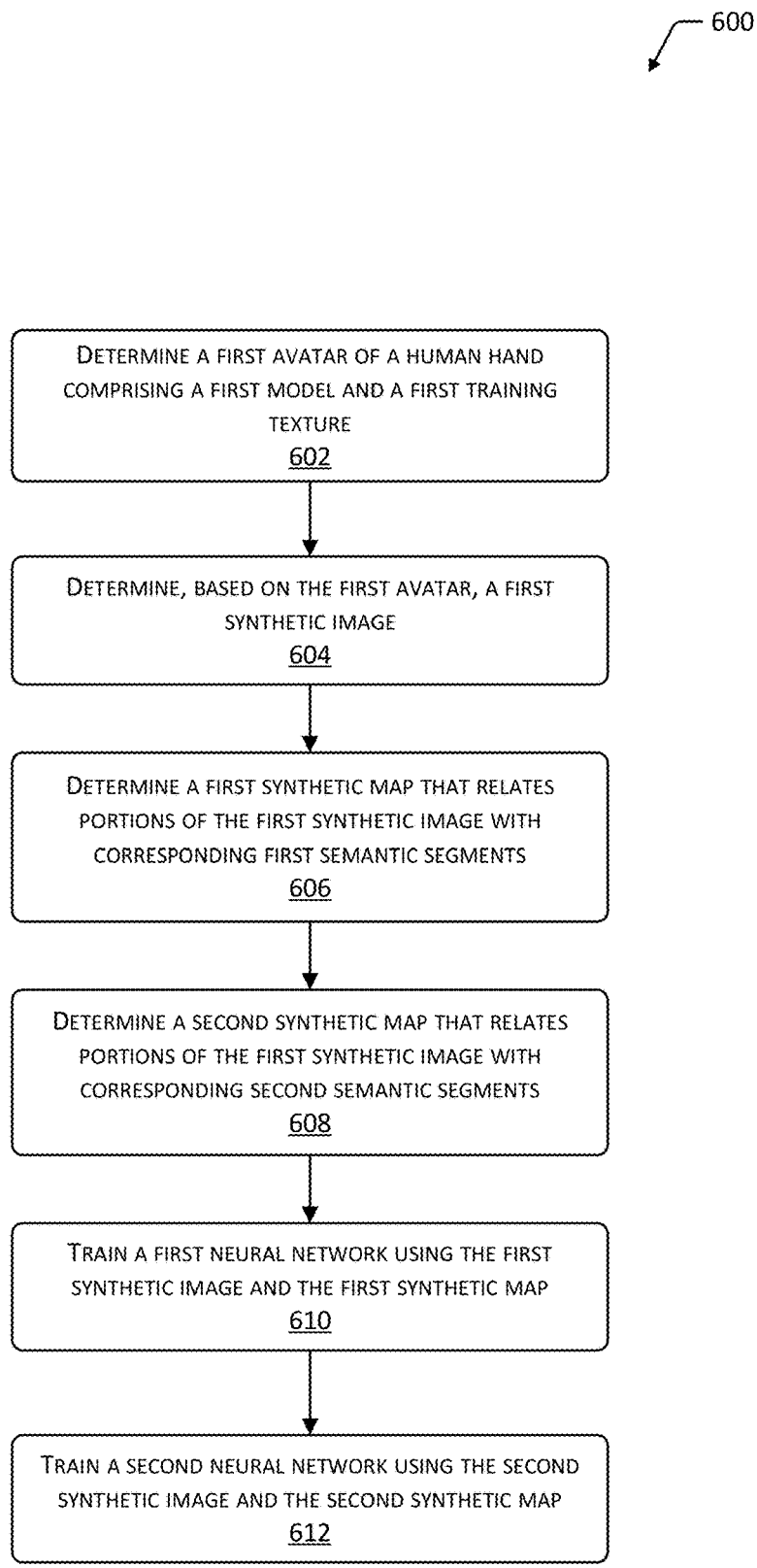
FIG. 6 is a flow diagram of a process to train, using synthetic images and synthetic maps, a neural network to determine annotation label maps, according to some implementations.

FIG. 6 is a flow diagram 600 of a process to train, using synthetic images and synthetic maps, a neural network to determine annotation label maps, according to some implementations. The process may be implemented at least in part by executing instructions on one or more processors of a computing device, such as a server or group of servers.

At 602 a first avatar of a human hand 102 is determined. The first avatar may comprise a training model representative of at least a portion of a three-dimensional human hand 102 and associated training texture. For example, training model data 144 may be retrieved from memory. In some implementations, the model may be manipulated to produce different poses, articulations, and so forth. For example, the training model data 144 may represent a hand with fingers together at a first time and a hand with fingers splayed apart at a second time. The first training texture data 142 of a first human hand 102 may be obtained using a first camera. For example, training texture data 142 may comprise one or more images of hands 102 acquired by the scanner 104 or another device.

At 604, based on the first avatar, first synthetic image data is determined. For example, techniques associated with texture mapping in computer graphics may be used to apply the training texture data 142 as a texture map to the surface of the model described by the training model data 144. Once "wrapped", a synthetic image of the model with the training texture on its surface may be determined. For example, the synthetic image data 146 may comprise an image of the wrapped model of the hand 102 as acquired by a virtual camera. The synthetic image data 146 may represent a projection of the points in the coordinate space associated with the model with respect to a synthetic image plane at the location and orientation of the virtual camera. A pose of the first model may be determined, with respect to a virtual camera. The first synthetic image data 146 may be determined, from a point of view of the virtual camera, using the first model with the first training texture data 142 applied to the surface of the first model. In other implementations, other techniques may be used to produce the synthetic image data 146.

At 606, first synthetic map data 148 is determined that relates portions of the first synthetic image data 146 with corresponding first semantic segments. For example, during the wrapping process where the training texture data 142 is applied to the surface of the model, information about the relative position of each pixel in the training texture data 142 with respect to the surface of the model is determined. This information is retained during the generation of the synthetic image data 146, allowing for the pixel in the training texture data 142 to be mapped to a particular pixel in the synthetic image data 146. Because the training model data 144 is known, the corresponding points on the surface of the hand 102 in the model can be associated with corresponding semantic segments. This allows the synthetic map data 148 to be created that relates a particular pixel in the training texture data 142 to be associated with a particular semantic segment in the first set of semantic segments 402. For example, the first set of semantic segments 402 may comprise horizontal strip regions that are associated with the first training texture data 142.

At 608 second synthetic map data 148 is determined that relates portions of the first synthetic image data 146 with corresponding second semantic segments in the second set of semantic segments 404. For example, the second set of semantic segments 404 may comprise vertical strip regions that are associated with the first training texture data 142.

At 610 a first neural network, such as in the first neural network module 206, is trained using the first synthetic image data 146 and the first synthetic map data 148 representative of the first set of semantic segments 402. For example, the first neural network module 206 may comprise a convolutional neural network in which supervised training is provided with the first synthetic image data 146 as input and the first synthetic map data 148 as the desired output. Based on this, the neural network may determine one or more weights or other parameters for the operation of the neural network. During training a plurality of synthetic image data 146 and the corresponding synthetic map data 148 may be used. The convolutional neural network may comprise a first pyramid scene parsing network configuration.

Similar to 610, at 612 a second neural network, such as in the second neural network module 210, is trained using the first synthetic image data 146 and the second synthetic map data 148 representative of the second set of semantic segments 404.

The set of training data used to train the neural networks may be generated by using various permutations of the avatars, such as changing one or more of pose of the hand 102 or articulation of the hand 102 represented by the training texture data 142 and the training model data 144.

In some implementations the first and second neural networks may be combined into a single neural network. For example, the first and second neural networks may comprise layers of a larger neural network.

Figure 7:
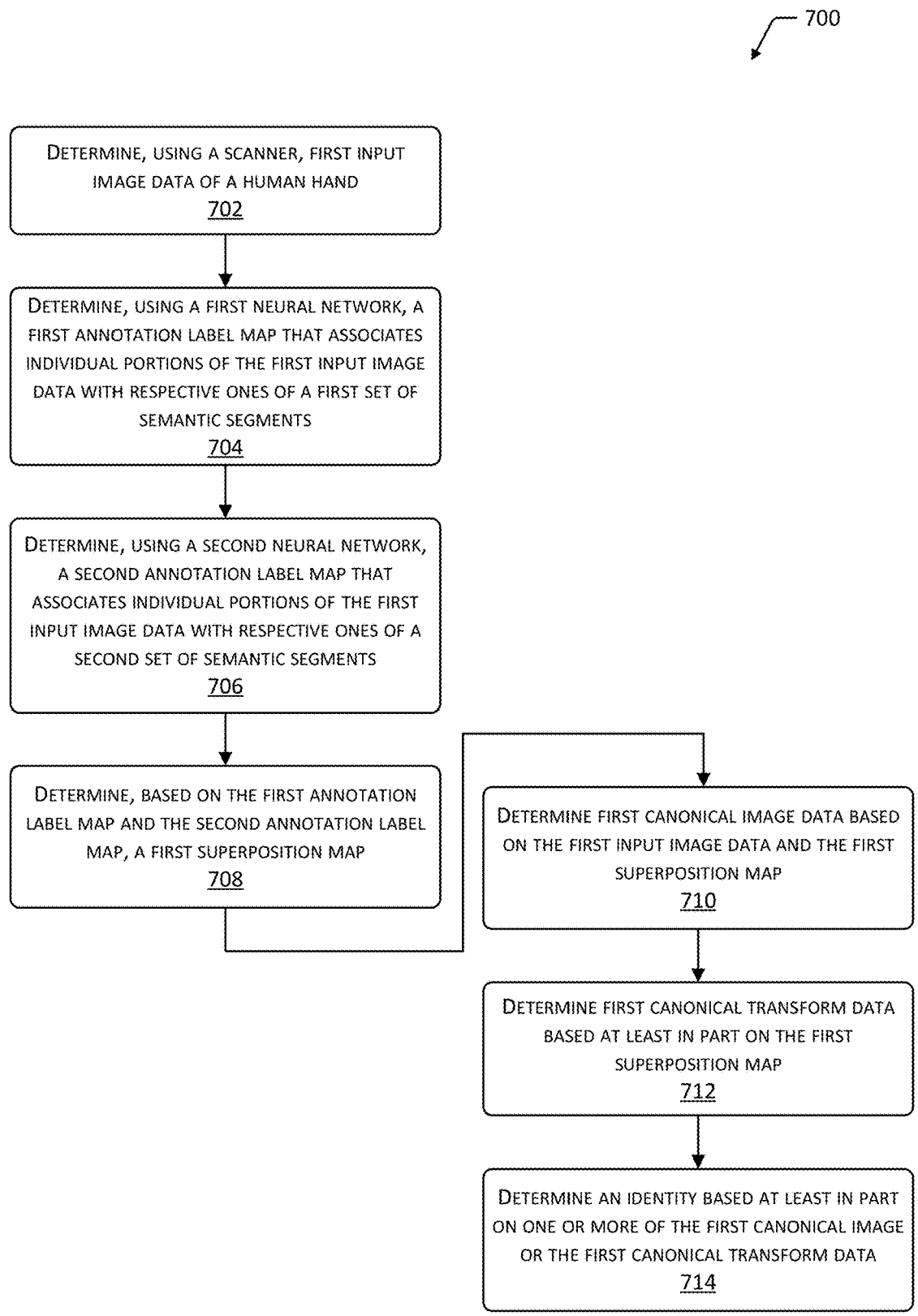
FIG. 7 is a flow diagram of a process to use a neural network to determine annotation label maps which are then used to determine a canonical image, according to some implementations.

Once trained, the one or more neural networks may be used to determine the canonical image data 124 as described with regard to FIG. 7.

FIG. 7 is a flow diagram 700 of a process to use a neural network to determine annotation label maps which are then used to determine a canonical image, according to some implementations. The process may be implemented at least in part by executing instructions on one or more of a processor of the computing device 106 within the scanner 104, on another computing device such as a server or group of servers accessible via a network, or a combination thereof.

At 702, first input image data 112 of a human hand 102 is determined. For example, the scanner 104 may be used to acquire the input image data 112.

At 704, using a first artificial neural network, a first annotation label map 208 is determined that associates individual portions of the first input image data 112 with respective ones of a first set of semantic segments 402. For example, the feature map module 202 may process the input image data 112 to determine the feature map 204. The feature map 204 may then be processed by the first neural network module 206 to determine the first annotation label map 208.

At 706, using a second artificial neural network, a second annotation label map 212 is determined that associates individual portions of the first input image data 112 with respective ones of a second set of semantic segments 404. Continuing the earlier example, the feature map 204 may also be processed by the second neural network module 210 to determine the second annotation label map 212.

At 708, first superposition map data 216 is determined based on the first annotation label map 208 and the second annotation label map 212. For example, the superposition module 214 may combine the first annotation label map 208 and the second annotation label map 212 to produce the first superposition map data 216.

At 710, first canonical image data 124 is determined based on the first input image data 112 and the first superposition map data 216. For example, the remapping module 218 may copy data associated with first pixels or groups of pixels, such as cells, from the input image data 112 to a corresponding position in the canonical image data 124 as indicated by the superposition map data 216.

At 712 first canonical transform data 126 is determined. For example, the first canonical transform data 126 may be at least in part on the first superposition map 216.

At 714 an identity is determined based at least in part on one or more of the first canonical image data 124 or the first canonical transform data 126. For example, the first canonical image data 124 and the first canonical transform data 126 may be processed by the identification module 160 to determine identification data 168.

Figure 8:
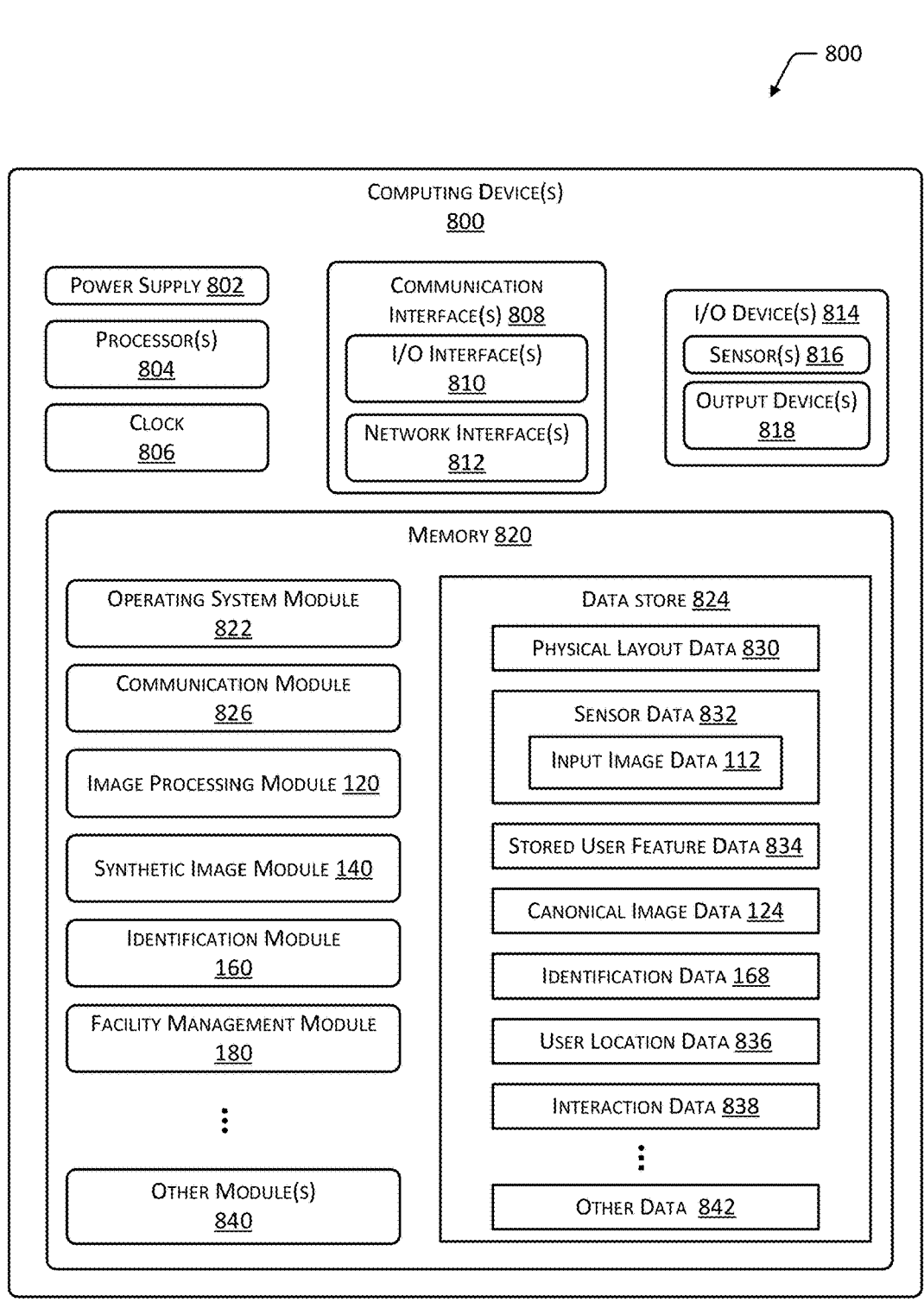
FIG. 8 is a block diagram of a computing device to generate the canonical image, according to some implementations.

FIG. 8 illustrates a block diagram of a computing device 800 to generate the canonical image data 124 or perform other functions, according to some implementations. The computing device 800 may be within the scanner 104, may comprise a server, and so forth. The computing device 800 may be physically present at the facility, may be accessible by a network, or a combination of both. The computing device 800 does not require end-user knowledge of the physical location and configuration of the system that delivers the services. Common expressions associated with the computing device 800 may include "embedded system", "on-demand computing", "software as a service (SaaS)", "platform computing", "network-accessible platform", "cloud services", "data centers", and so forth. Services provided by the computing device 800 may be distributed across one or more physical or virtual devices.

One or more power supplies 802 may be configured to provide electrical power suitable for operating the components in the computing device 800. The one or more power supplies 802 may comprise batteries, capacitors, fuel cells, photovoltaic cells, wireless power receivers, conductive couplings suitable for attachment to a power source such as provided by an electric utility, and so forth. The computing device 800 may include one or more hardware processors 804 (processors) configured to execute one or more stored instructions. The processors 804 may comprise one or more cores. One or more clocks 806 may provide information indicative of date, time, ticks, and so forth. For example, the processor 804 may use data from the clock 806 to associate a particular interaction with a particular point in time.

The computing device 800 may include one or more communication interfaces 808 such as input/output (I/O) interfaces 810, network interfaces 812, and so forth. The communication interfaces 808 enable the computing device 800, or components thereof, to communicate with other devices or components. The communication interfaces 808 may include one or more I/O interfaces 810. The I/O interfaces 810 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 810 may couple to one or more I/O devices 814. The I/O devices 814 may include input devices such as one or more of a sensor 816, keyboard, mouse, scanner, and so forth. The I/O devices 814 may also include output devices 818 such as one or more of a display device, printer, audio speakers, and so forth. In some embodiments, the I/O devices 814 may be physically incorporated with the computing device 800 or may be externally placed.

The network interfaces 812 may be configured to provide communications between the computing device 800 and other devices, such as carts, routers, access points, and so forth. The network interfaces 812 may include devices configured to couple to personal area networks (PANS), local area networks (LANs), wireless local area networks (WLANS), wide area networks (WANs), and so forth. For example, the network interfaces 812 may include devices compatible with Ethernet, Wi-Fi, Bluetooth, ZigBee, and so forth.

The computing device 800 may also include one or more busses or other internal communications hardware or software that allow for the transfer of data between the various modules and components of the computing device 800.

As shown in FIG. 8, the computing device 800 includes one or more memories 820. The memory 820 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 820 provides storage of computer-readable instructions, data structures, program modules, and other data for the operation of the computing device 800. A few example functional modules are shown stored in the memory 820, although the same functionality may alternatively be implemented in hardware, firmware, or as a system on a chip (SoC).

The memory 820 may include at least one operating system (OS) module 822. The OS module 822 is configured to manage hardware resource devices such as the I/O interfaces 810, the I/O devices 814, the communication interfaces 808, and provide various services to applications or modules executing on the processors 804. The OS module 822 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 820 may be a data store 824 and one or more of the following modules. These modules may be executed as foreground applications, background tasks, daemons, and so forth. The data store 824 may use a flat file, database, linked list, tree, executable code, script, or other data structure to store information. In some implementations, the data store 824 or a portion of the data store 824 may be distributed across one or more other devices including the computing devices 800, network attached storage devices, and so forth.

A communication module 826 may be configured to establish communications with one or more of the carts, sensors 816, display devices 818, other computing devices 800, or other devices. The communications may be authenticated, encrypted, and so forth.

The memory 820 may store the facility management module 180. The facility management module 180 may perform various functions, such as tracking items between different inventory locations, to and from the carts, generating restocking orders, directing operation of robots within the facility, using the identification data 168 to associate a particular user identity with a user in the facility, and so forth. During operation, the facility management module 180 may access sensor data 832 such as one or more of image data from cameras, weight data from weight sensors, and so forth.

Information used by the facility management module 180 may be stored in the data store 824. For example, the data store 824 may be used to store physical layout data 830, sensor data 832, stored user feature data 834, identification data 168, user location data 836, interaction data 838, and so forth.

The physical layout data 830 may provide information indicative of where scanners 104, cameras, weight sensors, antennas for radio receivers, inventory locations, and so forth are in the facility with respect to one another. For example, the physical layout data 830 may comprise information representative of a map or floor plan of the facility with relative positions of gates with scanners 104 and inventory locations.

The sensor data 832 may comprise information obtained from one or more of the sensors 816 in or associated with the facility.

The stored user feature data 834 may comprise feature data associated with particular user accounts. For example, the user feature data 834 may comprise feature signature data 164 that associates particular signatures of features with particular user accounts.

The facility management module 180 may generate the user location data 836 that is indicative of the location of the user within the facility. For example, the facility management module 180 may use image data obtained by the cameras to determine a location of the user. In other implementations, other techniques may be used for determining the user location data 836. For example, data from a smart floor may be used to determine the location of the user.

A user identity may be associated with location data based on the identification data 168. For example, the user enters the facility and has their palm scanned, producing identification data 168 that is indicative of their time of entry, a scanner 104 associated with where they entered, and their user identifier. The location data indicative of a path of a user that begins at the scanner 104 at the time of entry may be associated with the user identifier in the identification data 168.

Based on the user location data 836 and the interaction data 838, a particular interaction may be associated with an account of a particular user. For example, if the user location data 836 indicates that the user is present in front of inventory location 492 at time 17:47:20 and the interaction data 838 indicates a pick of a quantity of one item from an area on inventory location 492 at 17:47:27, the user may be billed for that pick.

The facility management module 180 may use the sensor data 832 to generate the interaction data 838. The interaction data 838 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 180 may generate interaction data 838 that indicates what item the user picked from a particular lane on a shelf, and then use this interaction data 838 to adjust the count of inventory stowed at that lane. The interaction data 838 may then be used to bill an account associated with the user identifier that is associated with the user who picked the item.

The facility management module 180 may process the sensor data 832 and generate output data. For example, based on the interaction data 838, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

The memory 820 may also store the identification module 160, the synthetic image module 140, and the image processing module 120 as described above.

Other modules 840 may also be present in the memory 820 as well as other data 842 in the data store 824. For example, a billing module may use the interaction data 838 and the identification data 168 to bill an account associated with a particular user.

The devices and techniques described in this disclosure may be used in a variety of other settings. For example, the system may be used in conjunction with a point-of-sale (POS) device. The user may present their hand 102 to a scanner 104 to provide an indication of intent and authorization to pay with an account associated with the identification data 168. In another example, a robot may incorporate a scanner 104. The robot may use the identification data 168 to determine whether to deliver a parcel to the user, and based on the identification data 168, which parcel to deliver.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
    a memory storing first computer-executable instructions; and
    a hardware processor to execute the first computer-executable instructions to:
        determine a first model, wherein the first model comprises data representative of a three-dimensional human hand;
        determine a first training texture, wherein the first training texture is of a first human hand as obtained using a first camera;
        determine, based on the first model and the first training texture, first synthetic image data;
        determine first synthetic map data that relates first individual pixels in the first synthetic image data with corresponding horizontal segments of a first set of horizontal segments that are associated with the first training texture;

determine second synthetic map data that relates second individual pixels in the first synthetic image data with corresponding horizontal segments of a second set of vertical segments that are associated with the first training texture;

train a first neural network using the first synthetic image data and the first synthetic map data;

train a second neural network using the first synthetic image data and the second synthetic map data;

determine a first input image of a second human hand;

determine a first feature map of the first input image;

determine superposition map data associated with the first input image, using the first neural network and the second neural network; and determine a first canonical image based on the first input image and the superposition map data.

2. The system of claim 1, the hardware processor to further execute the first computer-executable instructions to:

process the first feature map using the first neural network to determine a first annotation label map, wherein the first annotation label map associates a first portion of the first input image with respective horizontal segments of the first set of horizontal segments; and process the first feature map using the second neural network to determine a second annotation label map, wherein the second annotation label map associates a second portion of the first input image with respective horizontal segments of the second set of vertical segments;

wherein the first feature map of the first input image is determined using a third neural network; and wherein the superposition map data is determined based on the first annotation label map and the second annotation label map.

3. A method comprising:

determining a first avatar comprising:
   first training model data representative of a first model of at least a portion of a three-dimensional human hand, and
   first training texture data of a first human hand obtained using a first camera;

determining, based on the first avatar, first synthetic image data;

determining first synthetic map data that relates first portions of the first synthetic image data with corresponding first semantic segments;

determining second synthetic map data that relates second portions of the first synthetic image data with corresponding second semantic segments;

training a first convolutional neural network using the first synthetic image data and the first synthetic map data;

training a second convolutional neural network using the first synthetic image data and the second synthetic map data;

determining a first input image of a second human hand;

determining a first feature map of the first input image;

determining a first annotation label map using the first convolutional neural network; and determining a second annotation label map using the second convolutional neural network.

4. The method of claim 3, wherein:

the first convolutional neural network comprises a first pyramid scene parsing network; and the second convolutional neural network comprises a second pyramid scene parsing network.

5. The method of claim 3, wherein the determining the first synthetic image data comprises:

determining a pose of the first model with respect to a virtual camera;

determining an articulation of one or more joints indicated by the first model; and determining, from a point of view of the virtual camera, the first synthetic image data of the first avatar.

6. The method of claim 3, wherein:

the first semantic segments comprise regions associated with a first axis of the first training texture data; and the second semantic segments comprise regions that are associated with a second axis of the first training texture data.

7. The method of claim 3, wherein:

the first annotation label map associates first individual portions of the first input image with respective semantic segments of a first set of semantic segments; and the second annotation label map associates second individual portions of the first input image with respective semantic segments of a second set of semantic segments.

8. The method of claim 3, wherein the determining the first feature map comprises:

processing the first input image with a residual neural network to determine a first feature and a location of the first feature with respect to the first input image.

9. The method of claim 3, further comprising:

determining, based on the first annotation label map and the second annotation label map, first superposition map data; and determining a first canonical image based on the first input image and the first superposition map data.

10. The method of claim 9, further comprising:

determining a first set of feature vectors of the first canonical image;

determining, based at least in part on the first superposition map data, first canonical transform data indicative of a transform applied to the first input image to determine the first canonical image; and determining, based on the first set of feature vectors, a user identifier.

11. The method of claim 9, wherein:

the first input image comprises a first cell and a second cell;

the first superposition map data is indicative of a mapping of:
   the first cell in the first input image to a third cell in the first canonical image, and
   the second cell in the first input image to a fourth cell in the first canonical image; and the determining the first canonical image comprises:
   copying data associated with the first cell to the third cell; and
   copying data associated with the second cell to the fourth cell.

12. The method of claim 9, wherein the determining the first canonical image comprises:

processing, with a third convolutional neural network, the first input image and the first superposition map data.

13. A method comprising:

determining first input image data of a human hand, wherein the first input image data comprises a first cell and a second cell;

determining, using a first artificial neural network, a first annotation label map that associates first individual portions of the first input image data with respective semantic segments of a first set of semantic segments;

determining, using a second artificial neural network, a second annotation label map that associates second individual portions of the first input image data with respective semantic segments of a second set of semantic segments;

determining, based on the first annotation label map and the second annotation label map, first superposition map data, wherein the first superposition map data indicates a mapping of the first cell in the first input image data to a third cell in a first canonical image; and determining the first canonical image by copying data associated with the first cell in the first input image data to the third cell in the first canonical image.

14. The method of claim 13, wherein:

the first set of semantic segments are associated with a first axis of the first input image data; and the second set of semantic segments are associated with a second axis, perpendicular to the first axis, of the first input image data.

15. The method of claim 13, wherein the first set of semantic segments comprises thirty or fewer classes and the second set of semantic segments comprises thirty or fewer classes.

16. The method of claim 13, wherein:

the first artificial neural network comprises a first pyramid scene parsing network; and the second artificial neural network comprises a second pyramid scene parsing network.

17. The method of claim 13, wherein:

the first superposition map data is further indicative of a mapping of the second cell in the first input image data to a fourth cell in the first canonical image; and the determining the first canonical image further comprises copying data associated with the second cell in the first input image data to the fourth cell in the first canonical image.

18. The method of claim 13, further comprising:

determining an avatar comprising:

a first training model representative of at least a portion of a three-dimensional human hand, and first training texture data of a first human hand obtained using a first camera;

determining, based on the avatar, first synthetic image data;

determining first synthetic map data that associates first individual portions of the first synthetic image data with corresponding semantic segments of the first set of semantic segments;

determining second synthetic map data that associates second individual portions of the first synthetic image data with corresponding semantic segments of the second set of semantic segments;

training the first artificial neural network using the first synthetic image data and the first synthetic map data; and training the second artificial neural network using the first synthetic image data and the second synthetic map data.

19. The method of claim 18, wherein the determining the first synthetic image data comprises:

determining a pose of the avatar with respect to a virtual camera; and generating the first synthetic image data of the avatar from a point of view of the virtual camera.

20. The method of claim 13, further comprising:

determining a first set of feature vectors of the first canonical image; and determining, based on the first set of feature vectors, a user identifier.

21. A method comprising:

determining first input image data of a human hand;

determining, using a first artificial neural network, a first annotation label map;

determining, using a second artificial neural network, a second annotation label map;

determining first superposition map data based on the first annotation label map and the second annotation label map; and determining first canonical transform data.

* * * * *